C. L. Osborn.

Fernery.

N°. 96,265.  Patented Sep. 28, 1869.

Witnesses:
Earle A. Smyth
Wm. J. Johnson

Inventor:
Charles L. Osborn

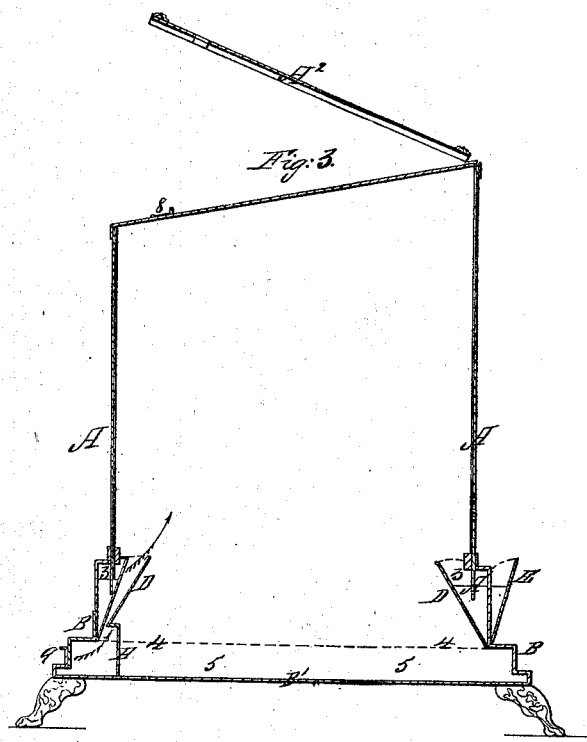

United States Patent Office.

CHARLES L. OSBORN, OF NEW YORK, N. Y.

Letters Patent No. 95,255, dated September 28, 1869.

IMPROVEMENT IN FERNERY.

The Schedule referred to in these Letters Patent and making part of the same.

*To all whom it may concern:*

Be it known that I, CHARLES L. OSBORN, of the State, city, and county of New York, have invented an Improved Fernery; and I do hereby declare that the following is a full, clear, and exact description of the same, reference being had to the accompanying drawings, wherein—

Figure 3 is a vertical section of the whole.

Figure 4 is a vertical section of the base.

Figure 5 shows part of the top of the case.

Figure 6 shows part of the lid, under side.

Prominent features of this invention are—

Figure 1:
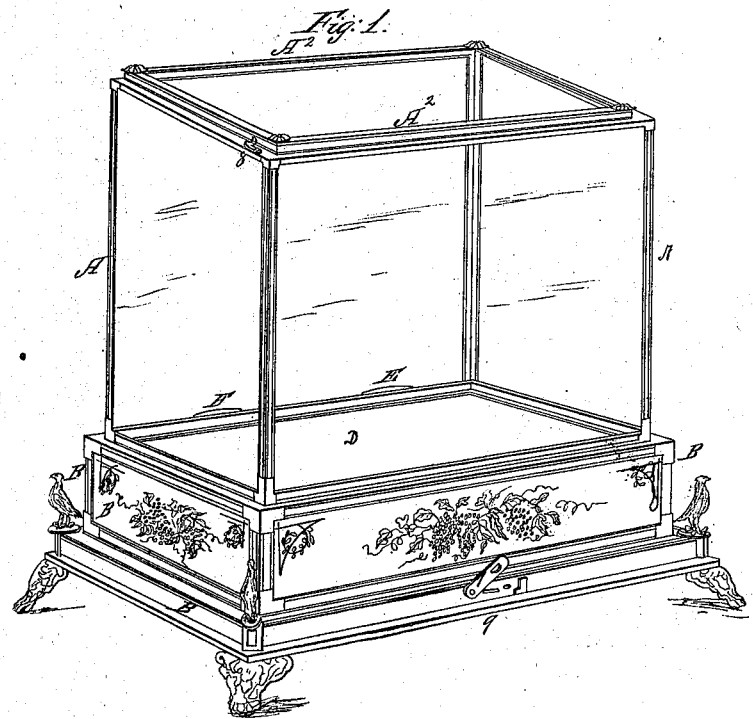
Figure 1 is a perspective view of the fernery, as seen from the front and end.
Figure 2:
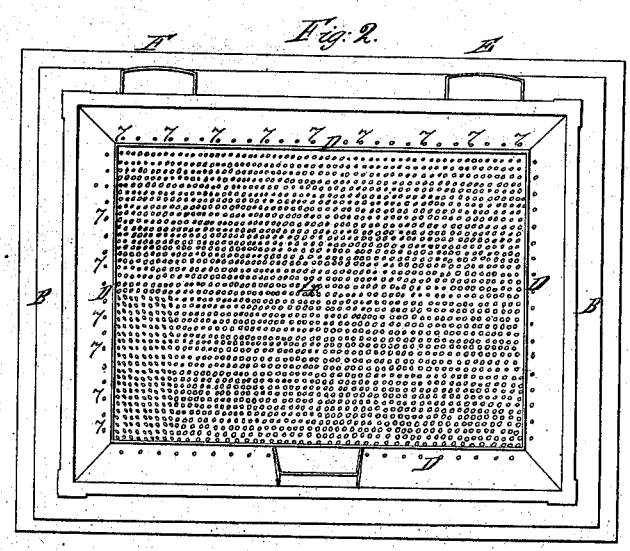
Figure 2 is a top view of the base only.

A system of ventilation in connection with an air-tight case.

The arrangement of a water-space around the earth-box.

The provision of a hollow space beneath the earth-box.

The form and construction of the earth-box, and other features, hereinafter described.

The fernery is comprised of a suitable case, A, usually formed of a metallic frame set with glass sides, and a hollow metallic base, B.

The base B contains the earth-box D, in which the plants are rooted.

A channel or water-space, 3, surrounds the earth-box and receives and holds the water by which the earth and plants are supplied with moisture.

The earth-box has a perforated bottom, 4, and is elevated from the bottom of the base B', leaving a space, 5, which may be filled with a fertilizing-substance with or without water; and the perforations in the bottom 4 permit the rootlets of the plants to receive moisture from below.

To give the largest space for the roots of the plants and the greatest possible evaporating-surface of water in the channel 3, the latter is made wide at the top and contracted at the bottom, by inclining the sides of the earth-box.

The case A is furnished with a hinged lid, A², which lid shuts down air-tight upon a raised rim or ledge, 1, around the top of the case, a strip of rubber, 2, being attached to the under side of the lid as a packing.

The lid is held down by suitable catches 8.

The lower part of the case A has a rim A¹, which, when the case is set in its place on the base, reaches down into the water-space or channel 3, and forms a water-joint, thus rendering the fernery entirely air-tight.

Water-ways E F are arranged on the outside of the base B, to receive and conduct water to the interior.

E communicates with the bottom of the channel 3, and F with the space beneath the earth-box.

The sides of the latter have perforations 7, near the upper edge, and the water in the channel 3 overflows and trickles slowly through them to the earth inside.

Normally, a fernery is presumed air-tight. This invention, however, is not to be confined to the growing of ferns proper, but is intended for any sort of plants whatsoever.

And in order to adapt the article to such plants as require a circulation of atmospheric air, I have provided apertures for ventilation, each having a cap, g, to shut off the air when not wanted.

The air entering the aperture g, in the base in fig. 3, is directed upward by partitions H.

I claim as my invention, and desire to secure by Letters Patent—

1. An air-tight fernery, comprised of two main parts or divisions, with a water-joint at the line of separation, and a close-shutting lid.

2. In combination with an air-tight fernery, the ventilating-apertures, having valves to shut off or admit the air to the interior as required.

3. In combination with an air-tight fernery, an earth-box, having a perforated bottom.

4. In combination with such earth-box, the space beneath it for fertilizers, or other purposes.

5. The perforations 7, in the sides of the earth-box, to allow the percolation of the water from the water-space, and the watering of the earth by overflow.

6. In combination with the water-spaces within the base, the application of the water-ways to the outside of the base communicating with the water-spaces at the bottom.

CHARLES L. OSBORN.

Witnesses:
EARLE H. SMITH,
WM. H. JOHNSON.